M. ALDEN.
Cultivator.
No. 23,886. Patented May 10, 1859.
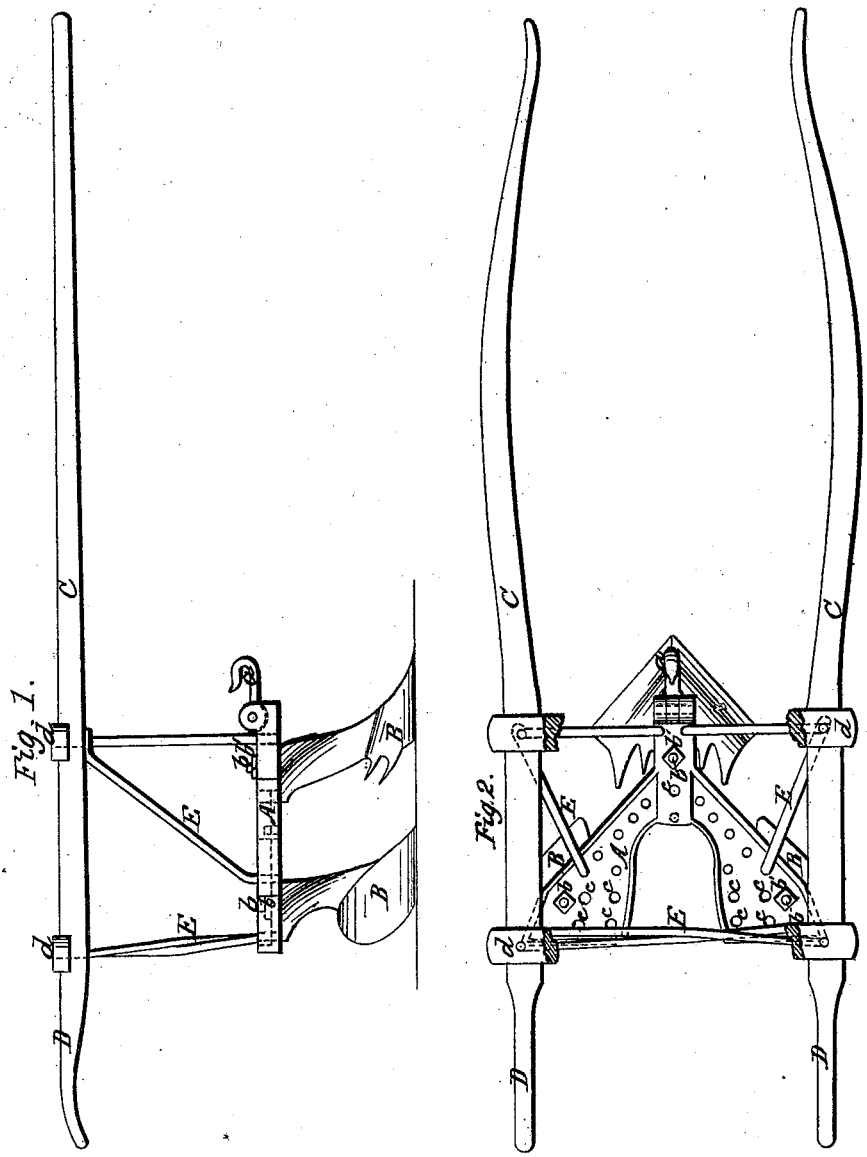

UNITED STATES PATENT OFFICE.

MILTON ALDEN, OF AUBURN, NEW YORK.

IMPROVEMENT IN CULTIVATORS.

Specification forming part of Letters Patent No. 23,886, dated May 10, 1859.

*To all whom it may concern:*

Be it known that I, MILTON ALDEN, of Auburn, in the county of Cayuga and State of New York, have invented a new and Improved Cultivator; and I do hereby declare that the following is a full, clear, and exact description of the same, reference being had to the accompanying drawings, in which—

Figure 1 represents a side elevation of a cultivator constructed according to my invention. Fig. 2 is a plan or top view of the same.

Similar letters in both figures indicate corresponding parts.

This invention consists in connecting the thills, which are made of one piece with the handles, with the frame by means of braces, in such a manner that the thills pass over the growing crops, and that the same are in a horizontal position, or nearly so, when attached to a horse or other draft-animal, and the frame is so arranged that the shares can be adjusted in the same, according to the width of different rows, and that a larger or smaller number of shares can be secured to the same.

To enable those skilled in the art to make and use my cultivator, I will proceed to describe its construction and operation.

A is a frame made of cast-iron or any other suitable material, and provided with a hook, $a$, to which the draft-animal is hitched. Secured to this frame are the plowshares or teeth B, by means of screws $b$ and nuts $b'$, and the frame is provided with a number of holes, $c$, which allow of changing the position and the number of the shares.

C C are the thills, which are made out of one piece with the handles D, and which are connected by cross-bars $d$, and they are secured to the frame A by means of braces E, which are attached to the frame and to the thills, as clearly represented in Fig. 2, and which keep the thills elevated so that the same are in a horizontal position, or nearly so, when attached to the draft-animal, and that they pass over the growing crops without injury.

The operation is as follows: The teeth or shares B are arranged according to the width of the rows for which it is to be used and according to the work to be done, this cultivator being equally applicable to weeding and hilling corn, tobacco, cotton, and all sorts of root-crops, and the draft-animal is hitched to the hook $a$, whereby the draft is direct from the body of the plow, and by having the thills raised and out of one piece with the handles, they not only pass over the growing crops without injury, but the driver obtains better control over the cultivator and over the draft-animal, than with any other similar device.

What I claim as new, and desire to secure by Letters Patent, is—

The within-described arrangement and combination, of the adjustable shares B, the frame A, and the raised thills C, which are made out of one piece with the handles D, to operate substantially in the manner and for the purpose specified.

MILTON ALDEN.

Witnesses:
F. G. DAY,
H. H. BEACH.